L. H. RENTZSCH.
METHOD OF MANUFACTURING REINFORCED TUBULAR OR HOLLOW BODIES.
APPLICATION FILED MAY 7, 1907.

937,178.

Patented Oct. 19, 1909.

L. H. RENTZSCH.
METHOD OF MANUFACTURING REINFORCED TUBULAR OR HOLLOW BODIES.
APPLICATION FILED MAY 7, 1907.

937,178.

Patented Oct. 19, 1909.

UNITED STATES PATENT OFFICE.

LOUIS HERMANN RENTZSCH, OF MEISSEN, GERMANY.

METHOD OF MANUFACTURING REINFORCED TUBULAR OR HOLLOW BODIES.

937,178.  Specification of Letters Patent.  Patented Oct. 19, 1909.

Application filed May 7, 1907. Serial No. 372,318.

*To all whom it may concern:*

Be it known that I, LOUIS HERMANN RENTZSCH, a subject of the King of Saxony, residing at Meissen, in Saxony, Empire of Germany, have invented a certain new and useful Method of Manufacturing Reinforced Tubular or Hollow Bodies, of which the following is a specification.

This invention relates to the centrifugal manufacture of hollow or tubular bodies of plastic material (more particularly cement, and gypsum with addition of organic or inorganic fibrous materials) provided with an insertion of so-called expanded metal, whereby the bodies, owing to the peculiar property of the insertion, become exceedingly strong and rigid.

The invention further consists in improvements in the centrifugal manufacture of such hollow bodies, the object of which is to effect a complete embedding of the expanded metal insertion in the wall produced.

The present invention relates to improvements in the manufacture of reinforced cement and like tubes or other hollow bodies formed by the centrifugal application of the cement material to an insertion of expanded metal in such a manner that an exceedingly strong and rigid structure is obtained, and the object of the invention is to so arrange the expanded metal insertion that a complete embedding of the same in the cement material is obtained.

Figure 1:
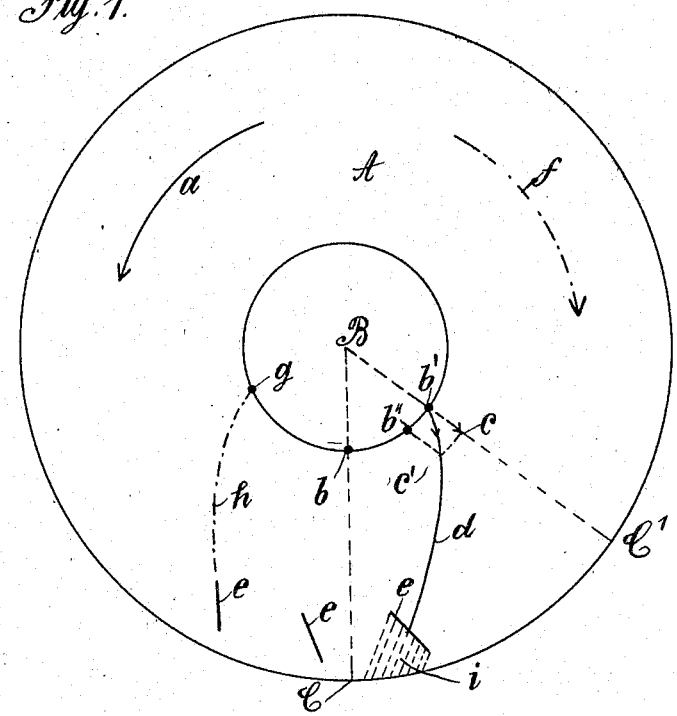
Figure 2:
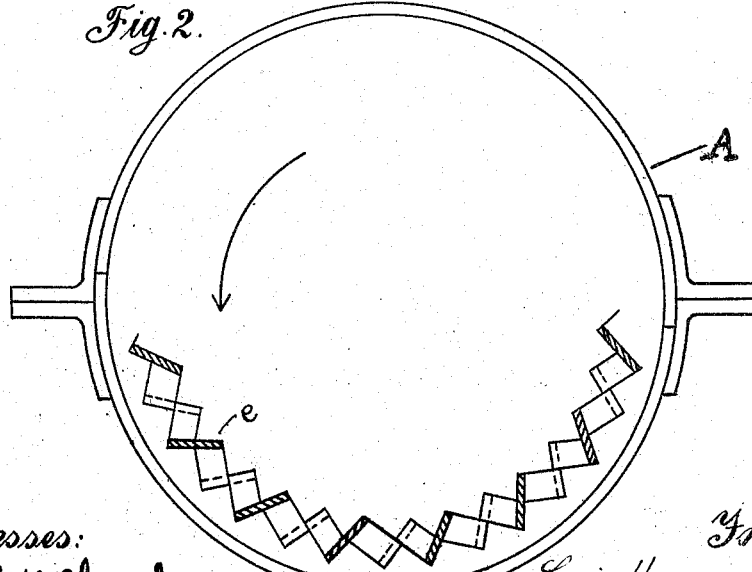
Figure 3:
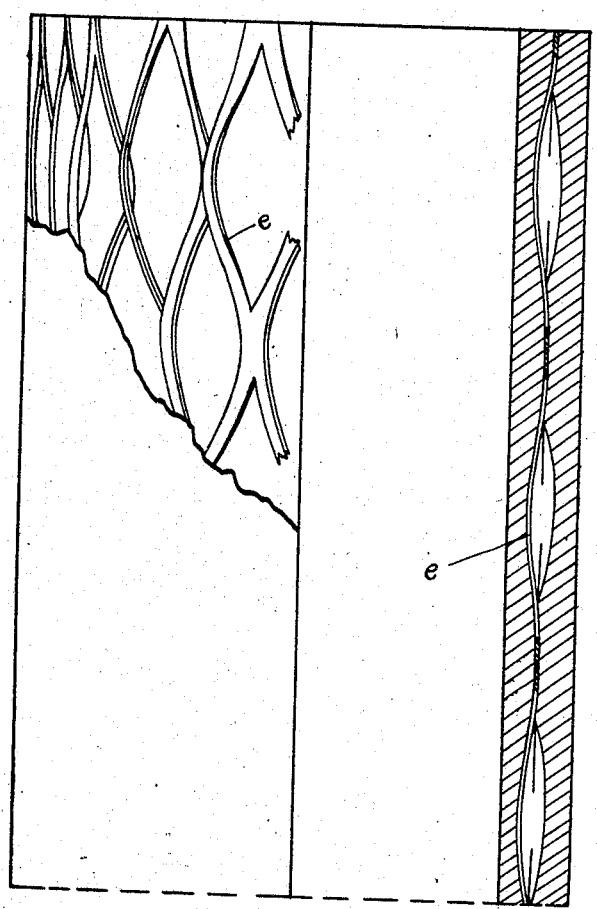

In the accompanying drawings—Figure 1 is a diagrammatic view showing the mold, and the expanded metal therein, and the direction in which the deposit of the plastic material takes place, both when the mold is rotated in the direction of the arrows $f$ and $a$. Fig. 2 is a cross-section of the mold with a portion of the expanded metal therein, the metal being arranged in a direction opposite to that in Fig. 1, but properly for the rotation of the mold in the direction of the arrow. Fig. 3 is an elevation partly in section of the complete reinforced tube with a portion broken away.

Similar letters of reference in the several figures indicate the same parts.

In carrying out the present invention it is necessary that the expanded metal should be properly inserted or arranged in the mold. First of all, the expanded metal must be made into tubular or hollow shape in such manner that the longitudinal direction of its meshes which, as is well known, are situated at a right angle to the direction of expansion, should be in the longitudinal direction of the tube, Fig. 3, as expanded metal has the greatest bending and tensional strength in that direction. In the tube mold the "bridges" of the expanded metal are not arranged however with their width in radial direction relatively to the axis of the tube, but in a position which forms an angle of about 30° with the radius of the tubular body.

The direction of rotation of the tube mold provided with the expanded metal insertion is of the greatest importance as will be shown by the following considerations.

Referring particularly to Fig. 1 of the drawings, the letter A indicates a circular surface which corresponds to the cross-section of the mold. Let us assume that this circular surface is rotated about its center B in the direction of the arrow $a$ and that a particle of the mass is arranged at $b$ on the circular surface. The particle is assumed to be freely movable on the circular surface. During the rotation, this particle will have the tendency to rotate with the same angular velocity about the center B, as the circular surface itself. As, however, the particle is not rigidly connected to the circular surface which is being rotated, its speed of rotation will be reduced by the influence of its own weight (inertia) and by friction (resistance of air), compared to the speed of rotation of the corresponding points of the circular surface. If, therefore, the surface rotates in a certain time in such manner that a point on the circumference moves from C to C', the particle $b$ will not move to $b'$, but only to $b''$. At the same time, however, centrifugal force acts on the particle and has the tendency to throw the particle out of its circular path outward in the direction of the arrow $c$. From the combined action of the said reduction of speed and of centrifugal force, it will be found that the particle will in reality move to $c'$. It will describe relatively to the circular surface a path represented by the curve $d$. As the speed of rotation of the single points of the circular surface increases with the length of the radius, the curve will deviate more and more strongly from the direction of rotation of the surface as it moves toward the circumference.

If at the circumference of the surface there is a bridge $e$ of expanded metal, which forms with the corresponding radius of the circular surface an angle of about 30°, and which races toward the axis of the tube, with the side which is in front in the direction of rotation, the particle of the mass will strike the said side at an angle of about 60°. There will thus be produced behind the bridge an area $i$ into which the particle of the mass cannot penetrate whichever be the point from which its movement starts. If, on the contrary, the direction of rotation of the surface is reversed, that is to say, if it is rotated in the direction of the chain-dotted arrow $f$, a particle of the mass situated at $g$ will describe the chain-dotted curve $h$ relatively to the surface. If the position of the bridge remains the same, the particle of the mass can reach any point of the circumference on the circular surface, as its line of advance is in the plane of the bridge itself. The bridge will therefore, no longer produce a protected zone into which the material cannot penetrate. These conditions are of importance in making reinforced hollow structures centrifugally. If the direction of rotation is selected in such manner that the wide sides of the bridges (in contradistinction to their edges) of the expanded metal inserted, facing the axis of the tube, are situated facing or opposite the direction of rotation, the bridge itself would form throughout the whole of its length and width a sheltered pressure-free zone behind the wide side of each bridge, which is situated at the back relatively to the direction of rotation. This zone could then be filled with the mass only by side pressure and moreover, the mass would be thrown by centrifugal force away from these wide sides of the bridges facing the wall of the mold. When the expanded metal is in such position relatively to the direction of rotation, hollow spaces are formed in the wall of the tube, filled with air or water, which give rise to blow holes and cracks and to loose and leaky portions in the mass. If, however, the direction of rotation of the tubular mold is selected in such manner that the wide sides of the bridges, facing the tubular axis, are situated at the rear relatively to the direction of rotation, the plastic mass will be projected in the direction of the plane of the bridges and will therefore only strike the narrow sides or edges of the bridges. The resulting force, which effects the projection of the mass, can in that case, freely act in the whole area of the mesh formed by the bridges and will press the whole mass therein contained into the mesh in a uniform and strong manner. In this case, therefore, the throwing off of the mass from the wide side of the bridges facing outward will not take place. The formation of air and water blow holes and other loose and defective places in the mass casing is thus avoided, and the thorough connection of the expanded metal with the mass into one single body is insured. The expanded metal frame work must be, therefore, always arranged in the centrifugal mold, as shown in Fig. 2, as above described relatively to the direction of rotation which is represented by the arrow in said figure.

The advantages given by the expanded metal insertion to the finished work produced by centrifugal force cannot be obtained by other metal insertions of the same strength, lightness and cheapness.

What I claim as my invention and desire to secure by Letters Patent is:—

A method of manufacturing tubular or hollow bodies from plastic material with expanded metal insertion consisting in inserting the expanded metal into a centrifugal mold in such manner that the sides of its "bridges" toward the axis of the mold form the rear sides relatively to the direction of rotation substantially as set forth.

In testimony whereof I have signed my name to this specification in the presence of two subscribing witnesses.

LOUIS HERMANN RENTZSCH.

Witnesses:
  WILHELM PAUL LIENEMDAM,
  RICHARD FRIEDRICH JULIUS IFFERTE.